United States Patent [19]
Krowicki et al.

[11] 3,855,200
[45] Dec. 17, 1974

[54] PROCESS FOR PREPARING 8-HYDROXYERTHROMYCIN A AND INTERMEDIATES THEREFOR

[75] Inventors: Krzysztof Krowicki; Aleksander Zamojski, both of Warsaw, Poland

[73] Assignee: Polska Akademia Nauk, Warsaw, Poland

[22] Filed: Apr. 23, 1973

[21] Appl. No.: 353,929

[52] U.S. Cl. .............................. 260/210 E, 424/180
[51] Int. Cl. ............................................ C07c 47/18
[58] Field of Search ................................. 260/210 E

[56] References Cited
UNITED STATES PATENTS
3,674,337   7/1942   Kurath ........................... 260/210 E
3,736,313   5/1973   Jones et al. ..................... 260/210 E

OTHER PUBLICATIONS

Wiley et al., J.A.C.S., Volume 79, pages 6,070–6,071 (1957).

Primary Examiner—Johnnie R. Brown
Assistant Examiner—Cary B. Owens
Attorney, Agent, or Firm—James L. Rowe; Everet F. Smith

[57] ABSTRACT

8-Hydroxyerythromycin A is prepared from 8,9-anhydroerythromycin A 6,9-hemiketal in two steps.

12 Claims, No Drawings

PROCESS FOR PREPARING 8-HYDROXYERTHROMYCIN A AND INTERMEDIATES THEREFOR

BACKGROUND OF THE INVENTION

Erythromycin A, an elaboration product of *Streptomyces erythreus*, was discovered by Bunch and McGuire in 1952. It has been marketed for many years as an antibiotic in most countries of the world and a derivative of erythromycin A, propionylerythromycin A in the form of its lauryl sulfate salt, is the antibiotic of choice in the treatment of certain human infections. Erythromycin A suffers from the disadvantage of being somewhat unstable at acidic pH's, such as in gastric juice.

8-Hydroxyerythromycin A has been prepared among other compounds by reduction of a crude oxidation mixture furnished by the $H_2O_2$—$OsO_4$ oxidation of 8,9-anhydroerythromycin A 6,9-hemiketal N-oxide. The oxidation mixture contained three components and hydrogenation over a palladium-on-charcoal catalyst yielded two reduction products in addition to 8-hydroxyerythromycin A. These two additional products were identified as 8,9-anhydro-8,9-epoxyerythromycin A 6,9-hemiketal, and 8,9-seco-8-oxoerythromycin A 9-oic acid, 6,9-lactone. Thin-layer chromatography was utilized to separate these materials. (See U.S. Pat. No. 3,674,773 issued July 4, 1972, Examples 5–7, Cols. 3–4.)

8,9-anhydroerythromycin B 6,9-hemiketal, 9-dihydroerythromycin A 6,9-epoxide and the corresponding erythromycin B derivative are disclosed and claimed in U.S. Pat. No. 3,681,323 issued Aug. 1, 1972. The 8,9-anhydro 6,9-hemiacetal of the aglycone of erythromycin B has been prepared and its oxidation and reduction products studies. [*Helv. Chim. Acta*, 54, 523 (1971)]. Among the products isolated were the 8,9-anhydro 6,9-hemiacetal 8,9-epoxide, the 9-dihydro 6,9-anhydro and the 8-hydroxy derivatives of erythromycin B aglycone.

It is an object of this invention to provide a method of preparing 8-hydroxyerythromycin A which is easy to carry out, gives high yields of the desired product and is economical.

SUMMARY OF THE INVENTION

In fulfillment of the above and other objects, this invention provides a process for preparing 8-hydroxyerythromycin A and derivatives thereof and to processes for preparing the intermediates therefor and to the intermediates themselves. The intermediates include the N-oxide of 8-hydroxyerythromycin A 6,9-hemiketal, the N-oxides of the 8-hydroxyerythromycin A $C_1$—$C_4$ alkyl-6,9-ketals, the N-oxide of 8-hydroxyerythromycin A $6^9$11-spiroketal and the 8-hydroxyerythromycin A $C_1$—$C_4$ alkyl-9,6-ketals and 8-hydroxyerythromycin A $6^9$11-spiroketals themselves.

8-Hydroxyerythromycin A can be represented by the following structure

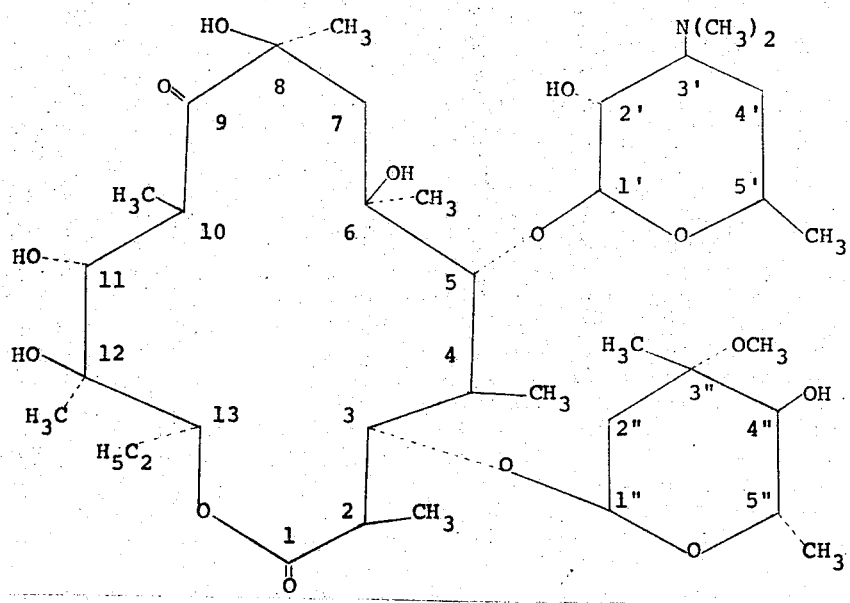

8-Hydroxyerythromycin A is a derivative of erythromycin A which has the same order of antibiotic activity as erythromycin A giving effective antibiotic blood levels in mammals but which is more stable to acid than the parent compound.

Erythromycin A, an elaboration product of *Streptomyces erythreus*, was discovered by Bunch and McGuire in 1952. It has been marketed for many years as an antibiotic in most countries of the world and a derivative of erythromycin A, propionylerythromycin A in the form of its lauryl sulfate salt, is the antibiotic of choice in the treatment of certain human infections. Erythromycin A suffers from the disadvantage of being somewhat unstable at acidic pH's, such as in gastric juice.

8-Hydroxyerythromycin A is a white crystalline solid melting at about 143°—5°C. It crystallizes with 1 mole of water of hydration to yield a monohydrate, m.p.=141°C. The compound has an acidic dissociation constant, pK=8.7 (66 in DMF). Molecular weight as determined by mass spectrograph was 749. The infrared spectrum showed maxima at 3,520, 1,740, and 1,695 cm$^{-1}$. The ultra-violet spectrum showed maxima at 279 nm, ($\epsilon$ = 15.4 in methanol), 280 nm ($\epsilon$ = 25.5 in water) and 275 nm ($\epsilon$ = 35 in water after acidification with hydrochloric acid). The compound had the following rotation: $[\alpha]_D^{20} = -54.5°$ ($c$ = 1, methanol).

8-Hydroxyerythromycin A is prepared by reacting 8,9-anhydroerythromycin A–6,9-hemiketal with a peracid in a mixture of ethyl acetate and water or in a C₁—C₄ alkanol such as methanol or in an anhydrous aprotic solvent such as chloroform, methylene chloride or ethyl ether/chloroform. When the reaction is conducted in a mixture of ethyl acetate and water, the N-oxide of 8-hydroxyerythromycin A–6,9-hemiketal is formed. The N-oxide of the hemiketal is then catalytically reduced to yield the desired 8-hydroxyerythromycin A.

When the reaction is conducted in methanol, the N-oxide of 8-hydroxyerythromycin A methyl-9,6-ketal is formed. The N-oxide of the ketal is then catalytically reduced to yield 8-hydroxyerythromycin A methyl-9,6-ketal. The latter compound is subjected to a mild acid hydrolysis to remove the methyl moiety of the methyl-9,6-ketal grouping, thus producing 8-hydroxyerythromycin A.

Other C₁—C₄ lower alcohols can be used in place of methanol as a solvent for the peracid reaction, such as ethanol, n-propanol and isopropanol. An N-oxide of 8-hydroxyerythromycin A C₁—C₄ alkyl-9,6-ketal, specifically the ethyl, n-propyl, isopropyl, n-butyl, sec.-butyl or isobutyl-9,6-ketal, is produced thereby, and can be successfully reduced to the 8-hydroxyerythromycin A ethyl, n-propyl, isopropyl, n-butyl, sec.-butyl or isobutyl-9,6-ketal and thence to 8-hydroxyerythromycin itself by the procedure exemplified above with respect to the methyl-9,6-ketal.

When the peracid reaction is conducted in anhydrous aprotic solvents such as for example chloroform, methylene chloride or ethyl ether/chloroform, the N-oxides of 8-hydroxyerythromycin A 6⁹12- and 6⁹11-spiroketals are formed. After separation, for instance by means of column chromatography, the N-oxide of 8-hydroxyerythromycin 6⁹11-spiroketal is catalytically reduced to yield 8-hydroxyerythromycin A 6⁹11-spiroketal. The latter compound, subjected to hydrolysis, for example in boiling aqueous acetic acid, gives 8-hydroxyerythromycin A.

It is believed that 8-hydroxyerythromycin and its esters exist in solution largely in the keto form (I) in equilibrium with the 9,12-hemiketal form (Ia).

Salts and esters of 8-hydroxyerythromycin A can be prepared in a conventional manner.

The starting material for the above synthetic procedure can be prepared by the method of Stephens and Conine, *Antibiotics Annual*, 1958–1959, 346 (referred to therein as erythromycin hemiketal) or by the method of Kurath, et al., *Experientia*, 27, 362 (1971).

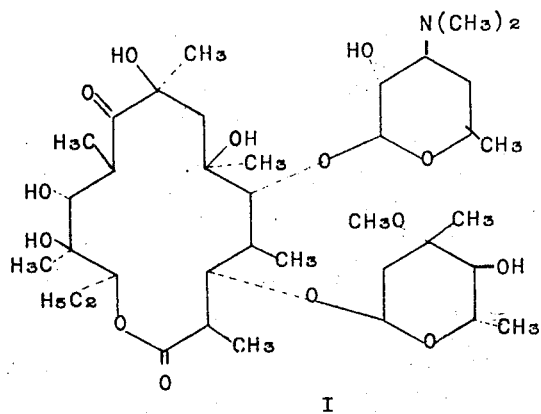

I

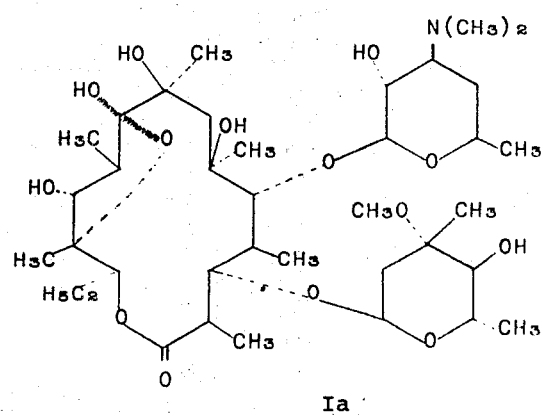

Ia

In carrying out one embodiment of the above reaction sequence for preparing 8-hydroxyerythromycin A, 8,9-anhydroerythromycin A 6,9-hemiketal (II) is reacted with a peracid such as m-chloroperbenzoic acid in a mixture of ethyl acetate and water. The product of this reaction, the N-oxide of 8-hydroxyerythromycin A 6,9-hemiketal (III), is readily reduced by hydrogen with a heavy metal catalyst such as platinum or palladium-on-carbon at low pressure in an alcoholic solvent such as methanol. The product of this reaction is 8-hydroxyerythromycin A (I–Ia) which is isolated as the rhodanide salt. Treatment of the rhodanide with dilute ammonium hydroxide yields 8-hydroxyerythromycin A free base.

In the other embodiment of the above reaction sequence for preparing 8-hydroxyerythromycin A, 8,9-anhydroerythromycin A-6,9-hemiketal (II) is reacted with a peracid such as m-chloroperbenzoic acid in methanol. The product of this reaction, the N-oxide of a 8-hydroxyerythromycin A methyl-9,6-ketal is also readily reduced by hydrogen with a heavy metal catalyst at low pressure in an alcoholic solvent such as methanol. The product of the reduction is subjected to a mild acid hydrolysis to produce 8-hydroxyerythromycin A. As previously stated, other C₁—C₄ alkanols can be used in place of methanol in the above reaction sequence to produce an N-oxide of a C₁—C₄ alkyl-9,6-ketal, which N-oxide can be reduced to form a 8-hydroxyerythromycin A C₁—C₄ alkyl-9,6-ketal, and the reduction product subjected to mild acid hydrolysis to produce 8-hydroxyerythromycin A.

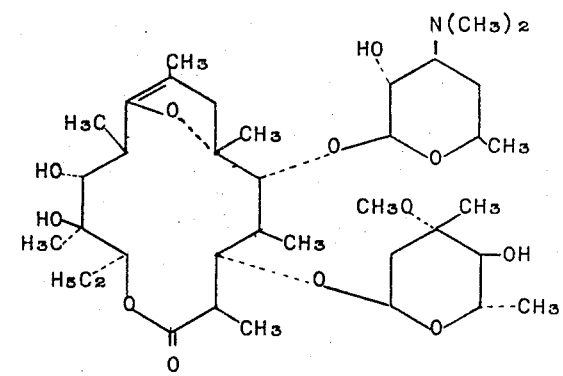

II

The further embodiment of the above reaction sequence for preparing 8-hydroxyerythromycin A, 8,9-anhydroerythromycin A 6,9-hemiketal (II) is reacted with a peracid such as m-chloroperbenzoic acid in an anhydrous aprotic solvent such as chloroform, methylene chloride or ethyl ether/chloroform. The result of this reaction is a mixture of N-oxides of 8-hydroxyerythromycin A $6^9 12$- and $6^9 11$-spiroketals. The N-oxide of 8-hydroxyerythromycin A $6^9 11$-spiroketal, separated for example by means of column chromatography, is also readily reduced by hydrogen with a heavy metal catalyst at low pressure in an alcoholic solvent such as methanol. The product of the reduction is subjected to hydrolysis, for example with boiling aqueous acetic acid, to produce 8-hydroxyerythromycin A, identical with samples obtained by the other methods mentioned above.

acid. In the table which follows, Column 1 gives the name of the antibiotic, Column 2, the concentration used, Column 3, incubation with acid if any, and Columns 4, 5, 6, and 7, zones of inhibition in the agar disc assay method in millimeters against the following organisms: Column 4, *S. aureus* A.T.C.C. 6,538P; Column 5, *B. subtilis* A.T.C.C. 6,633; Column 6, *Sarcina lutea* A.T.C.C. 9341; and Column 7, *Mycobacterium avium* A.T.C.C. 7992.

Table I

| Name of Antibiotic | Conc. mg/ml | Acid Treatment | Zone of Inhibition (Diameter in Millimeters) | | | |
|---|---|---|---|---|---|---|
| | | | S.aureus | B.subtilis | Sarcina lutea | M.avium |
| 8-hydroxyerythromycin A | .1 | pH=3.5 | 25 | 20 | 30 | 24 |
| | .01 | for 3.5 | 15 | 15 | 22 | 15 |
| | .005 | hours | 13 | 14 | 20 | Trace |
| | .1 | none | 29 | 22 | 30 | 20 |
| | .01 | none | 15 | 14 | 24 | 14 |
| | .005 | none | 13 | 12 | 20 | Trace |
| | .1 | pH=3.3 | 23 | 24 | 34 | 25 |
| | .01 | 25 hours | 16 | 17 | 24 | 15 |
| | .1 | none | 25 | 25 | 34 | 26 |
| | .01 | none | 17 | 17 | 24 | 15 |
| Erythromycin A | .1 | pH=3.5 | 17 | 17 | 23 | 14 |
| | .01 | for 3.5 | 12 | Trace | 18 | — |
| | .005 | hours | — | — | 14 | — |
| | .1 | none | — | 16 | 14 | — |
| | .01 | none | 21 | 20 | 30 | 17 |
| | .005 | none | 17 | 17 | 25 | Trace |
| | .1 | pH=3.3 | 20 | 20 | 28 | — |
| | .01 | 25 hours | 14 | 12 | 19 | — |
| | .1 | none | 18 | 25 | 36 | 30 |
| | .01 | none | 22 | 24 | 31 | 20 |

As can be seen from the above table, 8-hydroxyerythromycin A is substantially more stable in acid than is erythromycin A while the degree of antibiotic activity is comparable.

This invention is further illustrated by the following specific examples.

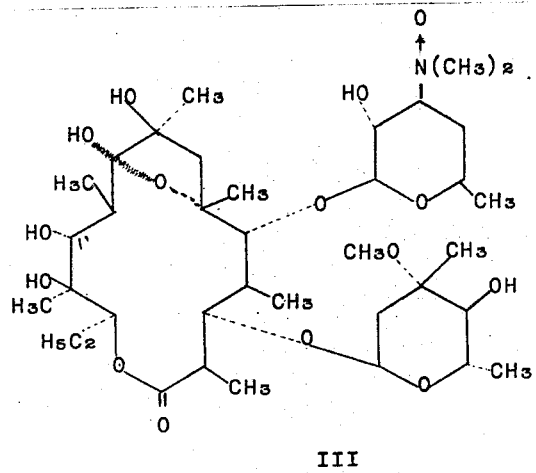

III

8-Hydroxyerythromycin A is antibiotically active and inhibits the growth many microorganisms such as *S. aureus*, including penicillin resistant strains, *B. subtilis*, *Salmonella paratyphae*, *Sarcina lutea*, *Shigella shigae*, *M. avium*, *B. cereus*, and *Streptococcus* species. In general, it has an antibiotic spectrum similar to that of erythromycin A.

The unexpected advantageous property of 8-hydroxyerythromycin A of being acid stable as compared to erythromycin A is shown by the following experiment in which 8-hydroxyerythromycin A and erythromycin A were tested, using a standard agar disc assay method, against 4 organisms, with and without treatment with Example 1

Seventy-one and six-tenths grams of 8,9-anhydroerythromycin A-6,9-hemiketal dissolved in a mixture of 400 ml. of ethyl acetate and 60 ml. of water were treated with 40.4 g. of m-chloroperbenzoic acid. The reaction mixture was stirred vigorously for 3.5 hours, and was then neutralized with 110 ml. of 2 N aqueous sodium hydroxide. The ethyl acetate layer was separated and washed with 100 ml. of water. Evaporation of the organic solvent yielded 5.8 g. of a yellow solid containing the N-oxide of 8-hydroxyerythromycin A 6,9-hemiketal (as shown by thin layer chromatography). The aqueous layer was extracted with methylenechloride for 17 hours in a continuous liquid—liquid extractor. Evaporation of the methylenechloride yielded 55 g. of an amorphous yellow solid consisting essentially of the N-oxide of 8-hydroxyerythromycin A 6,9-hemiketal. Recrystallization of the solid from 200 ml. of ethyl acetate yielded 47 g. of the N-oxide of 8-hydroxyerythromycin A 6,9-hemiketal melting at 215°–221°C.

Thirty grams of the above hemiketal were hydrogenated at 50 psi of hydrogen at room temperature using 30 g. of platinum oxide as a catalyst and 200 ml. of methanol as a solvent. The catalyst was separated by filtration and the methanol filtrate evaporated in vacuo. The resulting amorphous residue, comprising 8-hydroxyerythromycin A, was dissolved in 200 ml. of a water-acetic acid solvent mixture and the pH adjusted to 5.0. 0.05 moles of potassium thiocynate were added in 500 ml. of water, and 8-hydroxyerythromycin A rhodanide precipitated. 25 g. (80 percent yield) of 8-hydroxyerythromycin A rhodanide were obtained melting at about 182°–184°C.

Twenty-four grams of the above rhodanide salt were suspended in 300 ml. of water. Dilute aqueous ammonium hydroxide was added until a pH in the range 8.0–9.0 was obtained. The resulting solution, containing 8-hydroxyerythromycin A free base, was extracted with five 200 ml. portions of methylenechloride. The methylenechloride extracts were combined and the solvent removed in vacuo. The resulting residue was dissolved in 200 ml. of acetone and then the acetone solution was added to 500 ml. of water at 0°C. The solution was allowed to warm to room temperature. 19.1 g. of crystalline 8-hydroxyerythromycin A monohydrate were obtained melting at 141°C.

Analysis for $C_{37}H_{69}NO_{15}$
Calc.: C, 57.9; H, 9.05; N, 1.82; O, 31.3.
Found: C, 58.05; H, 8.96; N, 1.95; O, 31.3.

8-Hydroxyerythromycin crystallized in the absence of water melted at about 143°–5°C.

Analysis for $C_{37}H_{67}NO_{14}$
Calc.: C, 59.25; H, 9.01.
Found: C, 59.18: H, 9.12.

Example 2

1.02 grams of 8,9-anhydroerythromycin A 6,9-hemiketal and 0.313 grams of 77 percent m-chloroperbenzoic acid were dissolved in 30 ml. of methanol and left for 4 hours. After evaporation to dryness, the residue was treated with aqueous sodium bicarbonate and extracted with $CH_2Cl_2$. The extracts were evaporated and crystallization from acetone gave 640 mg. (64.5 percent) of N-oxide of 8-hydroxyerythromycin A methyl-6,9-ketal melting at 176°–178°C., having the following physical characteristics:

Infra-red ($CHCl_3$): 3,600 (OH), 1,718 cm$^{-1}$(CO of lactone).

Nuclear magnetic resonance: 1.54 (s,3H) —$CH_3$ at C8; 3.21 (s, 6H) —$NO(CH_3)_2$; 3.30 (s, 3H) and 3.44 (s,3H) —$2CH_3O$. Thin layer chromatography: ethanol-methylene chloride-ether 5:63:32,$R_f$ 0.4.

Analysis:
Calculated for $C_{38}H_{69}NO_{15}$: C, 58.52; H, 8.92%
Found: C, 58.41; H, 9.17%

630 mg. of the N-oxide of 8-hydroxyerythromycin A methyl-6,9-ketal were reduced with hydrogen in the presence of a platinum oxide catalyst in methanol as a solvent following the procedure of Example 1. After evaporation of the solvent, the residue was crystallized from hexane, b.p. 80°–100°, affording 502 mg. (80 percent) of methyl-6,9-ketal of 8-hydroxyerythromycin A, melting at 124°–126°C., and having the following physical characteristics:

Infra-red ($CHCl_3$): 3,530 (OH), 1,703 cm$^{-1}$(CO of lactone).

Nuclear magnetic resonance: 1.52 (s,3H) —$CH_3$ at 8; 2.26 (s,6H) —$N(CH_3)_2$; 3.26 (s,3H) and 3.40 (s,3H) —$2CH_3O$.

Analysis:
Calculated for $C_{38}H_{69}NO_{14}$: C, 59.74; H, 9.11%
Found: C, 59.94; H, 9.10%

Thin layer chromatography: ethanol-methylene chlorideethyl ether 5:55:40, $R_f$ 0.8.

Mild acid hydrolysis of the methyl-6,9-ketal compound yielded 8-hydroxyerythromycin A, which can be isolated as the rhodanide salt and the free base liberated by adding dilute ammonium hydroxide in accordance with the procedure of Example 1.

Other $C_1$—$C_4$ alkyl-9,6-ketals are preparable by the above procedure.

Example 3

1.5 grams of 8-hydroxyerythromycin A were dissolved in 5 ml. of pyridine and 0.2 ml. of acetic anhydride was added to the solution. After a day at room temperature, the reaction mixture was evaporated under reduced pressure; the resulting residue was dissolved in acetone, poured into aqueous sodium bicarbonate, and the resulting solution extracted with methylene chloride. Purification was effected by column chromatography on 90 grams of Kieselgel which contained 10 percent of basic $Al_2O_3$ (Woelm), using ethyl acetate followed by acetone as eluants. 1 gram of the 2'-acetate of 8-hydroxyerythromycin A, melting at 134°–137°C., was obtained, with the following physical characteristics:

Infra-red (KBr): 3,540 (OH), 1,745 (CO of lactone, ketone and acetate), 1240 cm$^{-1}$ ($CH_3COO$).

Ultra-violet: λ max 280 nm, ε21 (methanol).

Nuclear magnetic resonance: 1.58 and 1.65 (altogether 3H) —$CH_3$ at C8; 2.03 (s,3H) —$CH_3COO$; 2.26 (s,6H) —$N(CH_3)_2$; 3.28 and 3.32 (altogether 3H) —$CH_3O$.

$[\alpha]_D^{20} = -54.4\pm1°(c=1, methanol)$.

$pK_a=7.6$ in water.

Anti-bacterial activity in vitro against *Bacillus pumilus* —490 μg/mg. 8-Hydroxyerythromycin A 2'-acetate can be used in the same way as erythromycin of 8-hydroxyerythromycin A to combat infection in vivo or kill susceptible bacteria in vitro.

Example 4

0.5 gram of 8-hydroxyerythromycin A was acetylated with an excess of acetic anhydride following known procedures. After crystallization of the crude product from ligroin, b.p. 40°–60°C., 0.53 gram (90 percent) of the 2',4'', 11-triacetate of 8-hydroxyerythromycin A, melting at 112°–115°C., was obtained.

Infra-red ($CHCl_3$); 3,500 (OH), 1,735 (CO of lactone, ketone and acetate), 1,240 cm$^{-1}$ ($CH_3COO$).

Ultra-violet: λ max 285 nm, ε16 (methanol).

Nuclear magnetic resonance: 1.44 (s,3H) —$CH_3$ at C8; 2.01 (s,3H) —$CH_3COO$; 2.07(s, 6H) —$2CH_3COO$; 2.36 (s, 6H) —$N(CH_3)_2$; 3.34 H) 3H0 —$CH_3O$.

Analysis:
Calculated for $C_{43}H_{73}NO_{17}$: C, 58.95; H, 8.40%
Found: C, 58.86; H, 8.57%

In both Examples 3 and 4, other anhydrides derived from the $C_2$—$C_4$ alkanoic acids such as propionic anhydride, n-butyric anhydride and isobutyric anhydride can be used in place of acetic anhydride with the consequent production of $C_2$—$C_4$ alkanoate mono and triesters of 8-hydroxyerythromycin A such as the 2'-propionate, 2'-n-butyrate, 2',4'',11-tripropionate and the like esters.

Example 5

Ten grams of 8,9-anhydro-6,9-hemiketal of erythromycin A in 100 ml. chloroform were added to 6.24 grams of 77 percent m-chloroperbenzoic acid in 100 ml. chloroform. After 1 hour the mixture was shaken with aqueous $NaHCO_3$ and the chloroform layer evaporated. The residue was separated by column chromatography on a mixture of 9 parts silica gel and 1 part $Al_2O_3$ impregnated with formamide, using as eluant an ethanol-chloroform-ethyl ether solvent mixture in the ratio 5:63:32. The weight ratio of separated mixture to the gel employed was 1:100. The first compound eluted was the N-oxide of 8-hydroxyerythromycin A $6^9 11$-spiroketal. The second compound was the N-oxide of 8-hydroxyerythromycin A $6^9 12$-spiroketal. Crystallization of the first compound from methanol gave 2 grams of pure substance, m.p. 213°–217°.

IR/KBr/: 3,540 (OH), 1,725 (CO of lactone), 960 (oxetane ring), 920 $cm^{-1}$ (spiroketal). NMR: 1.53 (s,3H) —$CH_3$ at C8; 3.20 (s,6H) —$NO/CH_3/_2$; 3.38 (s,3H) —$CH_3O$.

This N-oxide was reduced with $H_2$/Pt in methanol in a quantitative manner. The reduction product crystallized from acetonitrile gave a monosolvate of 8-hydroxyerythromycin A $6^9 11$-spiroketal, m.p. 249°–251°, hydrorhodonide salt m.p. 188°–91°C., 2'4" diacetate m.p. 157°–160°C.

Analysis Calcd. for spiroketal, $C_{37}H_{65}NO_{13}\cdot CH_3CN$ (772.93):
  C, 60.59, H, 8.86%
Found:  C, 60.72; H, 8.97%.

IR/KBr/: 3,620 and 3,550 (OH), 1,725 (CO of lactone), 960 (oxetane ring), 920 $cm^{-1}$ (spiroketal). NMR: 1.53 (s,3H) —$CH_3$ at C8; 1.96 (s,3H) —$CH_3CN$; 2.25 (s,6H) —$N/CH_3/_2$ and 3.32 (s,3H) —$CH_3O$. $pK_a$ 8.8 (60 percent DMF).

We claim:

1. The process which consisting essentially of reacting 8,9-anhydroerythromycin A 6,9-hemiketal with m-chloroperbenzoic acid in a mixture of ethyl acetate and water to form the N-oxide of 8-hydroxyerythromycin A 6,9-hemiketal and then reducing said N-oxide with hydrogen in the presence of a platinum or palladium catalyst to produce 8-hydroxyerythromycin A.

2. The process which consisting essentially of reacting 8,9-anhydroerythromycin A 6,9-hemiketal with m-chloroperbenzoic acid in a $C_1$—$C_4$ alkanol to form the N-oxide of 8-hydroxyerythromycin A $C_1$—$C_4$ alkyl-6,9-ketal, reducing said N-oxide with hydrogen in the presence of a platinum or palladium catalyst, and subjecting the product of the reduction to an mild acid hydrolysis to produce 8-hydroxyerythromycin A.

3. The process which consisting essentially of reacting 8,9-anhydroerythromycin A 6,9-hemiketal with m-chloroperbenzoic acid in an anhydrous aprotic solvent to form the N-oxide of 8-hydroxyerythromycin A $6^9 11$-spiroketal, reducing said N-oxide with hydrogen in the presence of a platinum or palladium catalyst to the $6^9 11$-spiroketal of 8-hydroxyerythromycin A, and subjecting the product of the reduction to an mild acid hydrolysis to produce 8-hydroxyerythromycin A.

4. The process of claim 2 in which the $C_1$—$C_4$ alkanol is methanol and the ketal produced is 8-hydroxyerythromycin A methyl-6,9-ketal.

5. The N-oxide of 8-hydroxyerythromycin A $6^9 11$-spiroketal.

6. The N-oxide of an 8-hydroxyerythromycin A $C_1$—$C_4$ akyl-6,9-ketal.

7. A compound according to claim 6, said compound being the N-oxide of 8-hydroxyerythromycin A methyl-6,9-ketal.

8. A 2'—$C_2$—$C_4$ alkanoate of 8-hydroxyerythromycin A.

9. A compound according to claim 8 said compound being the 2'-acetate of 8-hydroxyerythromycin A.

10. The $6^9 11$-spiroketal of 8-hydroxyerythromycin.

11. A $C_1$—$C_4$ alkyl-6,9-ketal of 8-hydroxyerythromycin A.

12. A compound according to claim 11, said compound being the methyl-6,9-ketal of 8-hydroxyerythromycin A.

* * * * *